(12) United States Patent
Beechie et al.

(10) Patent No.: US 8,485,932 B2
(45) Date of Patent: Jul. 16, 2013

(54) AXLE SYSTEM

(75) Inventors: Brian E. Beechie, Armada, MI (US);
John D. Mueller, Southfield, MI (US);
Jeffrey M. Orzechowski, Troy, MI (US); Anurag Peter Varma, Royal Oak, MI (US); Mary Gerber, West Bloomfield, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 225 days.

(21) Appl. No.: 12/985,576

(22) Filed: Jan. 6, 2011

(65) Prior Publication Data

US 2012/0178576 A1    Jul. 12, 2012

(51) Int. Cl.
*F16H 57/04*    (2010.01)

(52) U.S. Cl.
USPC .......................................................... 475/161

(58) Field of Classification Search
USPC .......................................................... 475/161
See application file for complete search history.

(56) References Cited

U.S. PATENT DOCUMENTS

| | | | | |
|---|---|---|---|---|
| 2,010,622 A * | 8/1935 | Brown | ........................... | 219/635 |
| 3,752,222 A * | 8/1973 | Olbermann, Jr. | ............. | 165/280 |
| 4,391,235 A * | 7/1983 | Majkrzak | ............... | 123/142.5 R |
| 4,556,024 A * | 12/1985 | King et al. | ............... | 123/196 AB |
| 5,540,300 A | 7/1996 | Downs et al. | | |
| 5,638,774 A * | 6/1997 | Albertson et al. | ......... | 123/41.33 |
| 5,724,931 A * | 3/1998 | Hollis | ..................... | 123/142.5 R |
| 6,036,615 A | 3/2000 | Young et al. | | |
| 6,092,628 A | 7/2000 | Hinton et al. | | |
| 6,196,168 B1 * | 3/2001 | Eckerskorn et al. | ....... | 123/41.33 |
| 6,427,640 B1 * | 8/2002 | Hickey et al. | .............. | 123/41.31 |
| 6,432,018 B1 * | 8/2002 | Morse et al. | ................... | 475/161 |
| 6,499,565 B1 | 12/2002 | Coyle et al. | | |
| 6,520,136 B2 * | 2/2003 | Ito et al. | ................. | 123/142.5 R |
| 6,740,000 B2 * | 5/2004 | Wakayama | .................... | 475/161 |
| 6,758,266 B1 * | 7/2004 | Sjunnesson | .................. | 165/299 |
| 6,830,527 B2 * | 12/2004 | Wakayama | .................... | 475/161 |
| 6,981,545 B2 * | 1/2006 | Damson et al. | ............... | 165/297 |
| 7,077,776 B2 * | 7/2006 | Sorab et al. | .................... | 475/161 |
| 7,665,513 B2 * | 2/2010 | Sasaki | ........................... | 165/298 |
| 8,042,609 B2 * | 10/2011 | Samie et al. | ................... | 165/202 |
| 8,116,953 B2 * | 2/2012 | Lopez | ............................. | 701/54 |
| 8,205,709 B2 * | 6/2012 | Gooden et al. | ................ | 180/339 |

FOREIGN PATENT DOCUMENTS

| | | |
|---|---|---|
| EP | 0787929 A2 | 8/1997 |
| EP | 2251566 A1 | 11/2010 |
| FR | 2931120 A1 | 11/2009 |
| JP | 1224565 A | 9/1989 |

\* cited by examiner

*Primary Examiner* — Dirk Wright
(74) *Attorney, Agent, or Firm* — Frederick A. Krieger

(57) ABSTRACT

An axle system is provided that included an axle assembly having an axle member, a gear coupled with the axle member, and a housing encasing a lubrication fluid and at least a portion of the axle member and the gear therein. A device may selectively heat and/or cool the lubrication fluid at one or more regions of the axle system.

19 Claims, 3 Drawing Sheets

AXLE SYSTEM

FIELD

The present disclosure relates to an axle system and more particularly to an axle system having a temperature-control system.

BACKGROUND

Vehicles typically have an axle system that can include a drive shaft, axle members, and a gear set transmitting power from the drive shaft to the axle members to propel the vehicle. A housing encasing at least a portion of the gear set and the axle members contains a quantity of lubrication fluid to reduce friction and prolong the operational lifetime of components of the axle system. It is desirable to monitor and optimize the lubrication fluid to improve the operation and lifetime of the axle system.

SUMMARY

A system is provided that includes an axle assembly having an axle member, a gear coupled with the axle member, and a housing encasing a lubrication fluid and at least a portion of the axle member and the gear therein. The system further includes a device to selectively transfer heat to the lubrication fluid in a heating mode.

In another configuration, a system includes an axle assembly having a first axle member, a second axle member, a gear set, and a housing. The gear set may transmit rotational energy to the first and second axle members, the housing encasing a lubrication fluid, and at least one of the first axle member, the second axle member, and the gear set. A temperature-control apparatus may be in heat-transfer relation with the axle assembly and may selectively operate in a heating mode. A sensor may further measure a parameter indicative of an operating condition of the vehicle and may generate a signal indicative of the operating condition. A control module may be in communication with the temperature-control apparatus and the sensor, may receive the signal from the sensor, and may cause the temperature-control apparatus to operate in the heating mode based on data received from the sensor.

Further areas of applicability of the present disclosure will become apparent from the detailed description and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Disclosed herein are exemplary embodiments of an axle system that is provided with lubrication wherein one or more of the lubricant characteristics is controlled to improve the lubricant and axle system performance, and thereby improve vehicle performance such as fuel economy. Control includes raising or lowering a temperature of lubricant to a predetermined level at one or more portions of the axle system. Exemplary embodiments also disclosed herein are directed to utilizing one or more other vehicle components/systems to aid in control of the lubricant.

Figure 1:
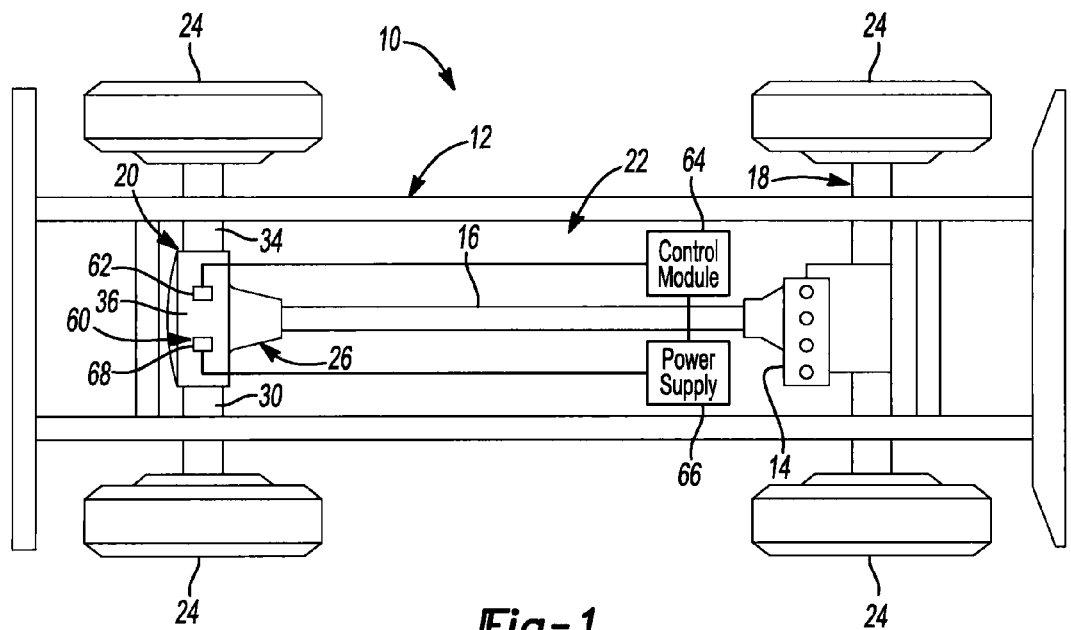
FIG. 1 is a schematic representation of a vehicle incorporating an exemplary embodiment of an axle system that includes an axle assembly and a temperature-control system according to the principles of the present disclosure.
Figure 2:
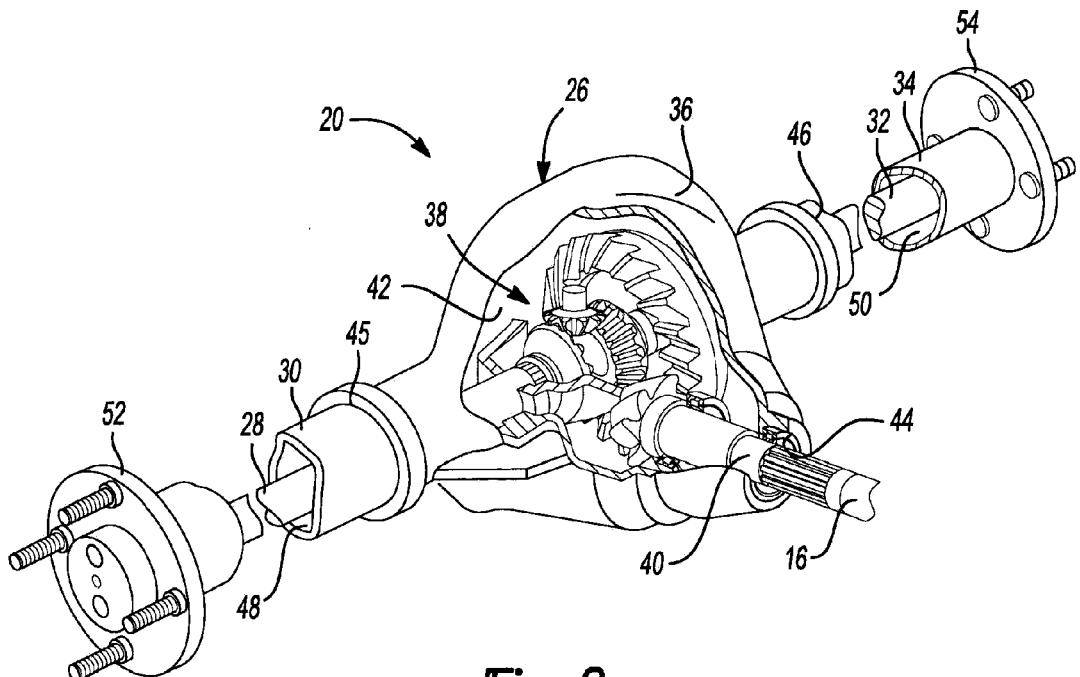
FIG. 2 is a partial perspective view of a rear-axle assembly with portions removed to show internal components of the rear-axle assembly.

In an exemplary embodiment and with reference to FIGS. 1 and 2, a vehicle 10 is provided and includes a chassis 12, a source of rotary power 14, a drive shaft 16, and an axle system that includes a first axle assembly 18, a second axle assembly 20, and a temperature-control system 22 for modifying a temperature of lubricant in the axle system. The vehicle 10 (shown schematically in FIG. 1) may be a car, truck, sport-utility vehicle, or tractor, for example, or any other personal, commercial, industrial or military vehicle. Further, while the vehicle is shown and described as including a chassis 12, the vehicle 10 could alternatively include a unibody construction.

The chassis 12 is coupled with the first and second axle assemblies 18, 20 and supports the source of rotary power 14, the body of the vehicle (not shown), and other vehicle components and systems. The source of rotary power 14 may include an internal combustion engine and/or an electric motor, for example, or any other power source. The source of rotary power 14 is operatively connected to the drive shaft 16, which may transmit rotary motion from the source of rotary power 14 to the second axle assembly 20. The axle assemblies 18, 20 are connected to and supported by wheels 24.

In the particular embodiment illustrated in the figures, the drive shaft 16 is connected to the second axle assembly 20, which may be a rear-axle assembly for a rear-wheel-drive driveline. The second axle assembly 20 may include a differential 26, a first axle member 28, a first axle tube 30, a second axle member 32, and a second axle tube 34. The differential 26 may include a housing or differential case 36, a differential gear set 38, and an input-shaft assembly 40. The differential case 36 may be formed from a casting process and/or one or more machining operations and includes a central cavity 42 having a first opening 44 receiving the input-shaft assembly 40, a second opening 45 receiving the first axle member 28, and a third opening 46 receiving the second axle member 32. The central cavity 42 may contain a volume of lubrication fluid (e.g., oil) that lubricates the moving components of the second axle assembly 20. The input-shaft assembly 40 engages the drive shaft 16 and the differential gear set 38, which transmits rotational energy from the drive shaft 16 to the first and second axle members 28, 32 to rotate the wheels 24 and propel the vehicle 10. The differential gear set 38 and the input-shaft assembly 40 may be conventionally configured.

The first and second axle members 28, 32 may be supported for rotation within internal volumes 48, 50 of the first and second axle tubes 30, 34, respectively. The first and second axle members 28, 32 may be connected to the wheels 24 via first and second hubs 52, 54, respectively. The first and second axle tubes 30, 34 may be connected to the differential case 36 at the second and third openings 45, 46, respectively, such that the central cavity 42 of the differential case 36 is in communication with the interior volumes 48, 50 of the first and second axle tubes 30, 34. In this manner, the differential case 36 and the first and second axle tubes 30, 34 may form a continuous housing such that the lubrication fluid may be communicated between the central cavity 42 and the internal volumes 48, 50.

Viscosity and other fluid properties of the lubrication fluid are a function of temperature and impact the efficiency and performance of the axle system and, thus, the vehicle 10 in general. The lubrication fluid may be selected for a particular vehicle to include a viscosity at a predetermined temperature (or within a predetermined temperature range) that optimizes the fuel economy or efficiency of the vehicle 10 while minimizing the wear on the components of the axle system. The fluid may also be selected to minimize noise, vibration and harshness (NVH) originating at the axle system when the lubrication fluid is at the predetermined temperature. The predetermined temperature may depend on a load experienced by the vehicle 10 and/or the particular design and/or configuration of the axle system, the vehicle 10, and/or a drivetrain of the vehicle 10.

In this embodiment, the temperature-control system 22 may include various apparatus such as a temperature-control device 60, one or more temperature sensors 62, and a control module 64. The temperature-control device 60 may be a heating and/or cooling device and may include an electrical-power supply 66 and one or more electrical devices 68. The power supply 66 is in electrical communication with the control module 64 and the electrical device 68. The power supply 66 may include a battery to provide electrical power to one or more other electrical systems and/or components of the vehicle 10.

The one or more electrical devices 68 may be disposed on or in the second axle assembly 20 at any suitable location to allow the devices 68 to be in heat-transfer relation with one or more components of the second axle assembly 20 and the lubrication fluid therein. For example, the electrical devices 68 may be disposed on or in the differential case 36, the first axle tube 30, and/or the second axle tube 34, for example. The electrical devices 68 may impart a heating or cooling effect on the lubrication fluid and one or more components of the second axle assembly 20 in response to receiving electrical current from the power supply 66, as will be subsequently described.

In some embodiments, the one or more electrical devices 68 may include an electrical-resistance-heating element or coil. In such embodiments, the heating element or coil generates heat as electrical current from the power supply 66. In other embodiments, the one or more electrical devices 68 may include a thermoelectric cooling unit or heat pump, for example. In such embodiments, the electrical device 68 may be operable in a heating mode and a cooling mode. In the heating mode, the electrical device 68 may transfer heat to the second axle assembly 20 and lubrication fluid in response to receiving electrical current from the power supply from a first direction. In the cooling mode, the electrical device 68 may absorb heat from the second axle assembly 20 and lubrication fluid in response to receiving electrical current from the power supply from a second direction.

The temperature sensors 62 may be disposed on or in the differential case 36, the first axle tube 30, and/or the second axle tube 34, for example. One or more of the temperature sensors 62 may be disposed in the central cavity 42 of the differential case 36 and may be substantially submerged in or in communication with the lubrication fluid contained therein. The temperature sensors 62 may continuously or intermittently generate signals indicative of detected temperature data and may communicate the signals to the control module 64.

As used herein, the term "control module" may refer to, be part of, or include an Application Specific Integrated Circuit (ASIC), an electronic circuit, a processor (shared, dedicated or group) and/or memory (shared, dedicated or group) that execute one or more software or firmware programs, a combinational logic circuit and/or other suitable components that provide the described functionality. The control module 64 may refer to, be a part of, or include a control module controlling one or more other vehicle systems. Alternatively, the control module 64 may be a control unit dedicated to the temperature-control system 22. While the control module 64 is shown in FIG. 1 as being located generally near the source of rotary power 14, the control module 64 can alternatively be disposed in any suitable location. The control module 64 may store data related to the fluid properties of the lubrication fluid including the predetermined temperature (or temperature range) at which the viscosity of the lubrication fluid is optimal for fuel economy, NVH and wear reduction for the particular vehicle 10.

With continued reference to FIGS. 1 and 2, operation of the temperature-control system 22 will be described in detail. As described above, the lubrication fluid in the second axle assembly 20 may be selected to include certain fluid properties, such as viscosity, at the predetermined temperature. The temperature-control system 22 maintains the lubrication fluid at or near the predetermined temperature over a variety of operating conditions to maintain desired fluid properties of the lubrication fluid.

In operation, the one or more temperature sensors 62 measure a temperature of the lubrication fluid and/or components in contact with the lubrication fluid. The temperature sensors 62 send signals indicative of such temperature measurements to the control module 64. The control module 64 may control the temperature-control device 60 based at least partially on the data received from the temperature sensors 62. For example, if the data received from the temperature sensors 62 indicates that the lubrication fluid is below the predetermined temperature—such as after a cold-start of the vehicle 10, for example—the control module 64 may cause the temperature-control device 60 to operate in the heating mode until data from the temperature sensors 62 indicates that the lubrication fluid is at or near the predetermined temperature.

In the heating mode, the control module 64 may cause the power supply 64 to send electrical current to the electrical device 68 in the first direction. As described above, supplying electrical current to the electrical device 68 from the first direction causes the electrical device 68 to heat the second axle assembly 20 and the lubrication fluid disposed therein. In this manner, the lubrication fluid may be quickly heated to its optimal temperature to optimize viscosity and improve fuel economy following a cold-start of the vehicle 10.

If the data received from the temperature sensors 62 indicates that the lubrication fluid is above the predetermined temperature, the control module 64 may cause the temperature-control device 60 to operate in the cooling mode until data from the temperature sensors 62 indicates that the lubrication fluid is at or near the predetermined temperature. In the cooling mode, the control module 64 may cause the power supply 64 to send electrical current to the electrical device 68 in the second direction. As described above, supplying electrical current to the electrical device 68 from the second direction causes the electrical device 68 to cool the second axle assembly 20 and the lubrication fluid therein.

Figure 3:
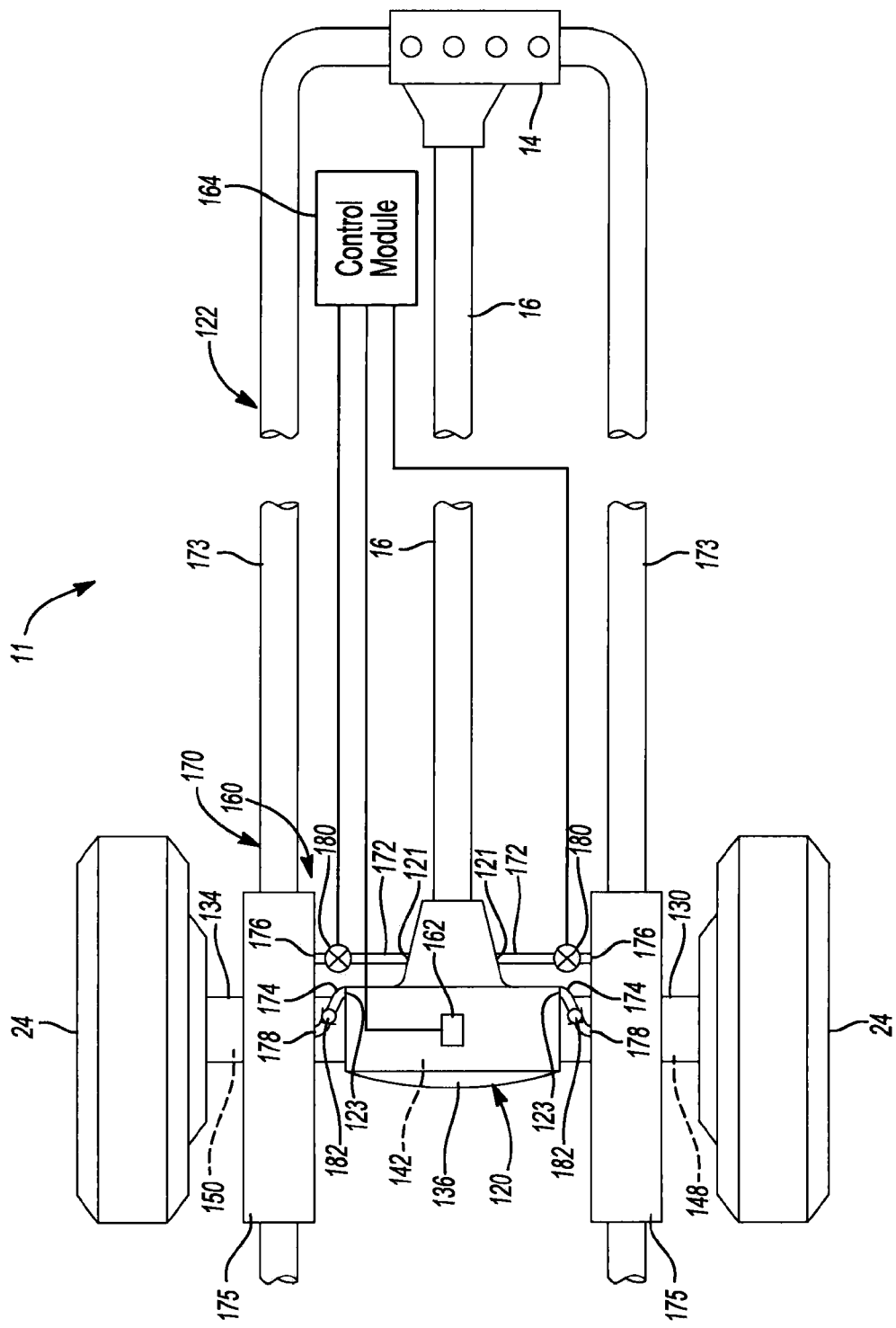
FIG. 3 is a schematic representation of another exemplary embodiment of an axle system according to the principles of the present disclosure.

In another exemplary embodiment and with reference to FIG. 3, another axle system that includes a second axle assembly 120 and a temperature-control system 122 will be described for use in conjunction with a vehicle 11 wherein exhaust gas is utilized to heat lubricant in the axle system. The structure and function of the second axle assembly 120 may be generally similar to that of the second axle assembly 20 described above, apart from the exceptions described below.

The second axle assembly 120 includes a differential case 136 that may include one or more fluid inlets 121 and one or more fluid outlets 123 in fluid communication with the central cavity 142 of the differential case 136 and the internal volumes 148, 150 of the first and second axle tubes 130, 134, respectively. In some embodiments, the fluid inlets 121 and fluid outlets 123 may be in fluid communication with a passageway (not shown) that extends through the differential case 136 and isolates fluid therein from the central cavity 142 and the internal volumes 148, 150.

The temperature-control system 122 may include a temperature-control device 160, one or more temperature sensors 162, and a control module 164. The structure and function of the temperature sensors 162 and the control module 164 may be generally similar to the temperature sensors 62 and control module 64 described above, apart from the exceptions noted below.

The temperature-control device 160 may include or more first conduits 172 and one or more second conduits 174. An exhaust system 170 is in fluid communication with the source of rotary power 14 and includes exhaust pipes 173 and one or more exhaust-gas treatment components 175, which may include a muffler, a catalytic converter, and/or other exhaust-gas treatment and/or routing components. The exhaust system 170 of the vehicle 11 receives hot exhaust gas discharged from the source of rotary power 14 and may filter-out particulate matter and noxious gasses before discharging the exhaust gas to the ambient environment. The exhaust system 170 may include outlets 176 and inlets 178. While the outlets 176 and inlets 178 are shown in FIG. 3 as being disposed at or near the exhaust-gas treatment components 175 proximate to a rear portion of the vehicle 10, the outlets 176 and inlets 178 could alternatively be disposed at any location along the length of the exhaust system 170 including at the exhaust pipe 173 or other exhaust-system component. While the exhaust system 170 shown in the figures includes a dual-exhaust configuration, the exhaust system 170 could alternatively include a single-exhaust configuration.

The first conduits 172 are fluidly coupled with the outlets 176 of the exhaust system 170 and the fluid inlets 121 of the differential case 136. The second conduits 174 are fluidly coupled with the inlets 178 of the exhaust system 170 and the fluid outlets 123 of the differential case 136. Additionally or alternatively, the first and/or second conduits 172, 174 may be fluidly coupled with inlets and/or outlets (not shown) in the first and/or second axle tubes 130, 134.

Each of the first conduits 172 may include a first valve assembly 180 controlling fluid flow therethrough. The first valve assemblies 180 may be solenoid valves, for example, or other electronically actuated valves. The first valve assemblies 180 may be in electrical communication with the control module 164. Each of the second conduits 174 may include a second valve assembly 182 controlling fluid flow therethrough. The second valve assemblies 182 may include a fluid-pressure-actuated check valve allowing fluid flow through the second conduits 174 from the differential case 136 to the exhaust system 170 but preventing fluid flow through the second conduits 174 from the exhaust system 170 to the differential case 136. In some embodiments, the second valve assemblies 182 could include electronically actuated valves.

With continued reference to FIG. 3, operation of the temperature-control system 122 will be described in detail. The temperature-control system 122 may heat the lubrication fluid in the second axle assembly 120 to a temperature approximately equal to a predetermined temperature to achieve desired fluid properties of the lubrication fluid. In an alternative embodiment it is contemplated one or more sensors can be employed to detect another characteristic, e.g. viscosity, of the axle system lubricant and then direct representative signals to the control module 164 to then modify the exhaust gas provided to one or more portions of the axle system in response to the signals.

As described above, the one or more temperature sensors 162 measure a temperature of the lubrication fluid and/or components in contact with the lubrication fluid. The temperature sensors 162 may send signals indicative of such temperature measurements to the control module 164. The control module 164 may control the temperature-control device 160 based at least partially on the data received from the temperature sensors 162.

If the data received from the temperature sensors 162 indicates that the lubrication fluid is below the predetermined temperature—such as after a cold-start of the vehicle 10, for example—the control module 164 may cause the first valve assemblies 180 to open and allow hot exhaust gas from the exhaust system 170 to flow through the first conduits 172 and into the differential case 136 and/or first and second axle tubes 130, 134. The hot exhaust gas in the differential case 136 and/or first and second axle tubes 130, 134 transfers heat to the lubrication fluid and one or more components of the second axle assembly 120. Exhaust gas may exit the differential case 136 through the fluid outlets 123 and flow through the second conduit 174 back to the exhaust system 170. The second valve assembly 182 may allow exhaust gas to flow from the second axle assembly 120 to the exhaust system 170 and prevent a backflow of exhaust gas from the exhaust system 170 to the second axle assembly 120 through the second conduit 174.

When the control module 164 receives data from the temperature sensors 162 indicating that the temperature of the lubrication fluid is at or near the predetermined temperature, the control module 164 may cause the first valve assemblies 180 to close and prevent the flow of hot exhaust gas from the exhaust system 170 to the second axle assembly 120. Under such circumstances, hot exhaust gas bypasses the differential case 136a and proceeds through the exhaust-gas treatment components 175. In another embodiment, post-treated exhaust gas can be provided to one or more portions of the axle system to modify the temperature of the lubricant therein.

Figure 4:
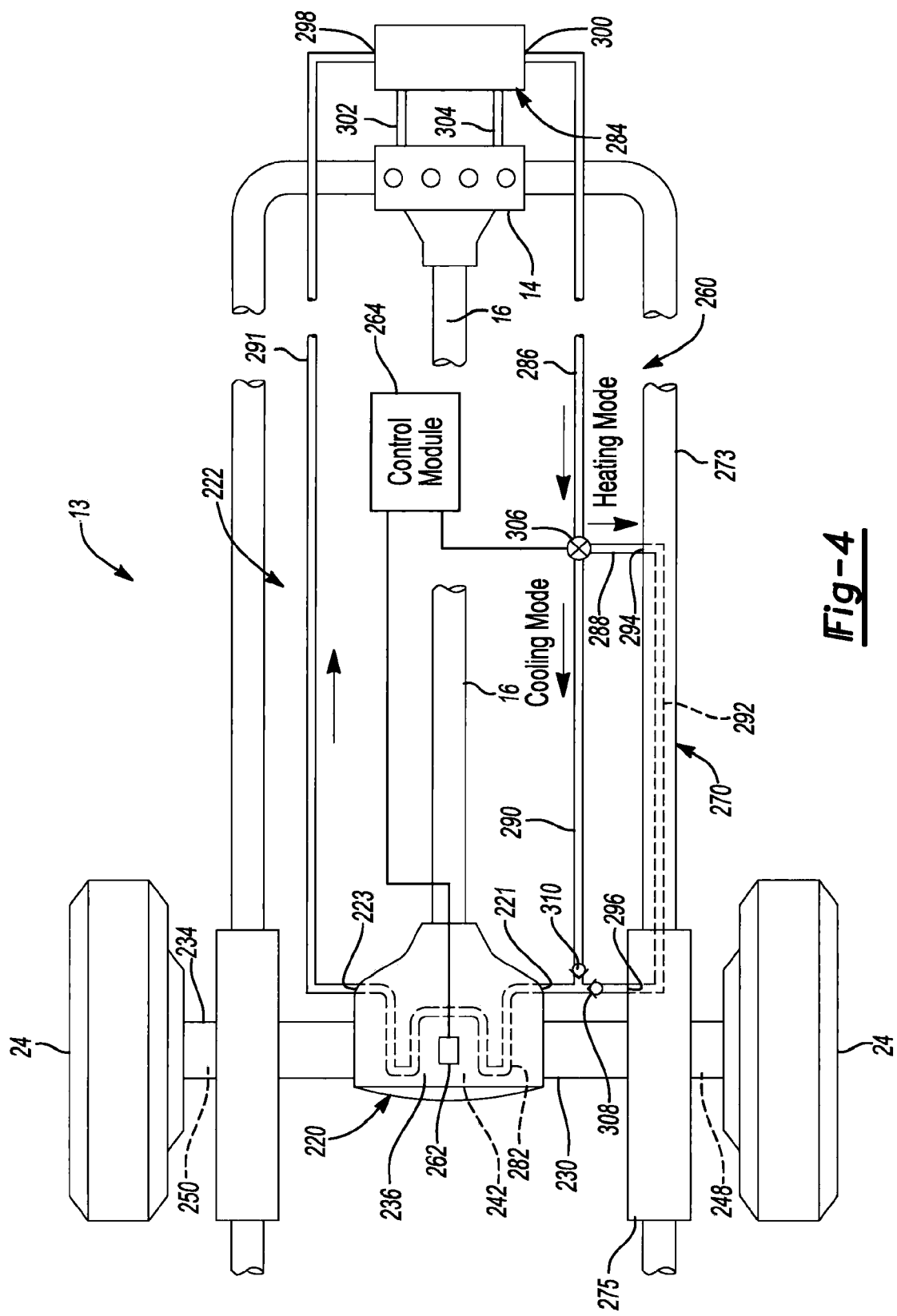
FIG. 4 is a schematic representation of another exemplary embodiment of an axle system according to the principles of the present disclosure.

In another exemplary embodiment and with reference to FIG. 4, another axle system is provided and includes a second axle assembly 220 and a temperature-control system 222 for use in conjunction with a vehicle 13 wherein lubricant in the axle system is heated and cooled. The structure and function of the second axle assembly 220 may be generally similar to that of the second axle assembly 20 described above, apart from the exceptions described below.

The second axle assembly 220 includes a differential case 236 that may include a fluid passageway 282 having an inlet 221 and an outlet 223. The fluid passageway 282 may be fluidly isolated from a central cavity 242 of the differential case 236 and the internal volumes 248, 250 of first and/or second axle tubes 230, 234. The fluid passageway 282 may be constructed from a material having a relatively high coefficient of thermally conductivity and may include relatively thin walls to facilitate heat transfer therethrough. The fluid passageway 282 may extend in a generally serpentine manner to increase a surface area of the differential case 236 with which the fluid passageway 282 is in contact. In some embodiments, the fluid passageway 282 may extend into the first and/or second axle tubes 230, 234.

The temperature-control system 222 may include a temperature-control device 260, one or more temperature sensors 262, and a control module 264. The structure and function of the temperature sensors 262 and the control module 264 may be generally similar to the temperature sensors 62 and control module 64 described above, apart from the exceptions noted below.

The temperature-control device 260 may include a heat exchanger 284, a first conduit 286, a second conduit 288, a third conduit 290, and a fourth conduit 291 coupled to an exhaust system 270 of the vehicle 10b. The structure and function of the exhaust system 270 may be generally similar to the exhaust system 170 described above, apart from the following exceptions. The exhaust system 270 may include a fluid passageway 292 extending at least partially therethrough. The fluid passageway 292 may be in heat-transfer relation with the exhaust gas flowing through the exhaust system 270 and may be fluidly isolated therefrom. The fluid passageway 292 may include an inlet 294 and an outlet 296. The inlet 294 may be disposed in an exhaust pipe 273, for example, or any other suitable location in the exhaust system 270. The outlet 296 may be disposed in an exhaust-gas treatment component 275, for example, or any other suitable location in the exhaust system 270. The inlet 294 may be in fluid communication with the second conduit 288, and the outlet 296 may be in fluid communication with the third conduit 290.

The heat exchanger 284 may include a fluid coil (not shown) through which a coolant, refrigerant, water, or other fluid may flow. A pump such as a compressor (not shown) may force the fluid therethrough. The fluid coil may include an inlet 298 in fluid communication with the fourth conduit 291 and an outlet 300 in fluid communication with the first conduit 286. In some embodiments, the heat exchanger 284 may be a radiator in fluid communication with the source of rotary power 14 via a first coolant pipe 302 and a second coolant pipe 304. In other embodiments, the heat exchanger 284 may be a heater core or a condenser of a heating, ventilating, and air conditioning (HVAC) system, for example, or any other heat exchanger.

The first conduit 286 may extend from the outlet 300 of the heat exchanger 284 to a valve assembly 306. The valve assembly 306 may be a three-way valve in fluid communication with the first conduit 286, the second conduit 288, and the third conduit 290. The valve assembly 306 may be movable between first, second, and third positions. In the first position, the valve assembly 306 may allow fluid communication between the first conduit 286 and the second conduit 288 and prevent fluid communication between the first conduit 286 and the third conduit 290. In the second position, the valve assembly 306 may allow fluid communication between the first conduit 286 and the third conduit 290 and prevent fluid communication between the first conduit 286 and the second conduit 288. In the third position, the valve assembly 306 may prevent fluid communication between the first conduit 286 and the third conduit 290 and prevent fluid communication between the first conduit 286 and the second conduit 288. The valve assembly 306 may be actuated via a solenoid, a stepper motor, or any other suitable actuation means. The control module 264 may be in communication with the valve assembly 306 and may selectively cause the valve assembly 306 to move between the first, second and third positions.

The third conduit 290 may be connected to the valve assembly 306, the outlet 296 of the fluid passageway 292 of the exhaust system 270 and the inlet 221 of the fluid passageway 282 in the second axle assembly 220. The third conduit 290 may include a first check valve 308 and a second check valve 310. The first check valve 308 may be disposed downstream of the outlet 296 of the fluid passageway 292 in the exhaust system 270. The first check valve 308 may allow fluid flow from the fluid passageway 292 into the fluid passageway 282 but prevent fluid flow in the opposite direction (i.e., from the fluid passageway 282 into the fluid passageway 292). The second check valve 310 may be disposed downstream from the valve assembly 306 and may allow fluid to flow from the valve assembly 306 to the fluid passageway 282 in the second axle assembly 220, but prevent fluid from flowing from the fluid passageway 292 toward the valve assembly 306. In some embodiments, the third conduit 290 could include a single three-way valve to control flow therethrough rather than the check valves 308, 310 described above.

The fourth conduit 291 may be in fluid communication with the outlet 223 of the fluid passageway 282 in the second axle assembly 220 and the inlet 298 of the heat exchanger 284. Fluid may flow through the fourth conduit 291 from the outlet 223 to the inlet 298.

With continued reference to FIG. 4, operation of the temperature-control system 222 will be described in detail. As described above, the lubrication fluid in the second axle assembly 220 may be selected to include certain fluid properties, such as viscosity, at the predetermined operating temperature. The temperature-control system 222 maintains the lubrication fluid at or near the predetermined temperature over a variety of operating conditions to maintain desired fluid properties of the lubrication fluid.

As described above, the one or more temperature sensors 262 measure a temperature of the lubrication fluid and/or components in contact with the lubrication fluid. The temperature sensors 262 send signals indicative of such temperature measurements to the control module 264. The control module 264 may control the temperature-control system 222 based at least partially on the data received from the temperature sensors 262.

If the data received from the temperature sensors 262 indicates that the lubrication fluid is below the predetermined temperature—such as after a cold-start of the vehicle 10—the control module 264 may cause the temperature-control system 222 to operate in a heating mode to heat the second axle assembly 220 and the lubrication fluid therein until data from the temperature sensors 262 indicates that the lubrication fluid is at or near the predetermined temperature. In this manner, the lubrication fluid may be quickly heated to its optimal temperature to optimize viscosity and improve fuel economy following a cold-start of the vehicle 10. If the data received from the temperature sensors 262 indicates that the lubrication fluid is above the predetermined temperature, the control module 264 may cause the temperature-control system 222 to operate in a cooling mode to cool the second axle assembly 220 and the lubrication fluid therein.

During operation of the temperature-control system 222, fluid may enter the heat exchanger 284 from the fourth conduit 291 and from the first coolant pipe 302. The pump may cause the fluid to flow through the coil of the heat exchanger 284, where heat from the fluid may be rejected to ambient air. A fan (not shown) may force air across the heat exchanger 284 to facilitate heat transfer from the fluid to ambient air. Relatively cool fluid may exit the heat exchanger 284 through the second coolant pipe 304 and the outlet 300. The cool fluid from the outlet 300 may flow through the first conduit 286 to the valve assembly 306.

To operate the temperature-control system 222 in a heating mode, the control module 264 may cause the valve assembly 306 to move to the first position to allow fluid communication between the first conduit 286 and the second conduit 288 and prevent fluid communication between the first conduit 286 and the third conduit 290. When the valve assembly 306 is in the first position, the cool fluid in the first conduit 286 may flow into the second conduit 288 to the fluid passageway 292 in the exhaust system 270. The fluid may flow through the fluid passageway 292 and absorb heat from the exhaust gas flowing through the exhaust system 270. The fluid exiting the fluid passageway 292 may be relatively hot compared to the cool fluid entering the fluid passageway 292 from the second conduit 288.

From the outlet 296 of the fluid passageway 292, the hot fluid may flow through the first check valve 308 in the third conduit 290 and flow toward the inlet 221 of the fluid passageway 282 in the second axle assembly 220. The relatively hot fluid flowing through the fluid passageway 282 may transfer heat to one or more components of the second axle assembly 220 and the lubrication fluid therein. The fluid may exit the fluid passageway 282 through the outlet 223 and flow into the fourth conduit 291. The fluid may flow through the fourth conduit 291 back to the heat exchanger 284, where the cycle may be repeated until the control module 264 determines that the lubrication fluid is at or near the predetermined temperature.

When the control module 264 determines that the lubrication fluid is at the predetermined temperature (or within a predetermined range of the predetermined temperature), the control module 264 may cause the valve assembly 306 to move into the third position, preventing fluid communication between the first conduit 286 and the third conduit 290 and between the first conduit 286 and the second conduit 288. When the valve assembly 306 is in the third position, fluid flow through the first conduit 286 may cease, however, fluid may still circulate between the source of rotary power 14 and the heat exchanger 284 via the first and second coolant pipes 302, 304. The circulation of fluid between the source of rotary power 14 and the heat exchanger 284 may be controlled independently of the temperature-control system 222.

When the control module 264 determines that the lubrication fluid is above the predetermined temperature (or above the predetermined temperature range), the control module 264 may cause the valve assembly 306 to move into the second position. As described above, when the valve assembly 306 is in the second position, the cool fluid from the first conduit 286 may be allowed to flow into the third conduit 290 and may be prevented from flowing into the second conduit 288. In this manner, the cool fluid in the third conduit 290 bypasses the exhaust system 270. The cool fluid flowing through the third conduit 290 from the valve assembly 306 may flow pass through the second check valve 310 and into the inlet 221 of the fluid passageway 282 of the second axle assembly 220. The first check valve 308 may prevent the cool fluid from entering the fluid passageway 292 of the exhaust system 270.

Cool fluid flowing through the fluid passageway 282 in the second axle assembly 220 may absorb heat from the components of the second axle assembly 220 and the lubrication fluid therein. In this manner, the temperature of the lubrication fluid may decrease and its viscosity may increase. The fluid may exit the fluid passageway 282 through the outlet 223 and flow into the fourth conduit 291. The fluid may flow through the fourth conduit 291 and back to the heat exchanger 284. This cycle may be repeated until the control module 264 determines that the lubrication fluid is at or near the predetermined temperature.

While the temperature-control systems 22, 122, 222 are described above as controlling a temperature of the second axle assembly 20, 120, 220, the temperature-control systems 22, 122, 222 could be configured to control a temperature of lubrication fluid within a front-axle assembly, a four-wheel-drive transfer case, and/or any other drivetrain component or assembly. Additionally, it is contemplated that combinations of the embodiments described in the aforementioned figures and respective descriptions can be utilized for monitoring and controlling lubricant at one or more portions of an axle system. For example, different regions of an axle system may receive different amounts or rates of exhaust gas to account for different thermal heat transfer requirements (cross sectional areas; materials, amount/types of lubricant present, etc.) at the different regions of the axle system. In another example, it may be more appropriate to provide heat to a lubricant region of an axle system while another region may require that the lubricant at that location to be cooled. It is contemplated that in certain applications, an embodiment of an axle system will include a control module and sensors that provide for monitoring of the axle system lubricant conditions, and possibly other conditions such as ambient temperature, vehicle operating demands, input from other vehicle components and systems, and in response thereto provide direction for heating and/or cooling of one or more portions of the axle system lubricant in accordance with predetermined lubricant and vehicle operating criteria.

What is claimed is:

1. An axle system comprising:
    an axle assembly including an axle member, a gear coupled with said axle member, and a housing encasing a lubrication fluid and at least a portion of said axle member and said gear therein;
    a device selectively transferring heat to said lubrication fluid in a heating mode by passing a fluid through said housing;
    a sensor detecting at least one property of said lubrication fluid; and
    a control module in communication with said sensor and controlling said device in response to information received from said sensor.

2. The axle system of claim 1, wherein said property is at least one of a temperature and a viscosity of said lubrication fluid.

3. The axle system of claim 1, wherein said device includes a conduit extending into said housing, said conduit being fluidly isolated from said lubrication fluid.

4. The axle system of claim 1, wherein said device is operable to cool said lubrication fluid in a cooling mode.

5. The axle system of claim 1, wherein said device selectively supplies heat from an exhaust system to said lubrication fluid.

6. The axle system of claim 1, wherein said device includes a heat exchanger and a conduit communicating a coolant between the heat exchanger and said housing.

7. The axle system of claim 6, wherein said heat exchanger is an engine-coolant radiator.

8. The axle system of claim 1, wherein said axle assembly is a rear-wheel-drive axle assembly.

9. The axle system of claim 1, wherein said housing is a differential housing.

10. An axle system for a vehicle comprising:
an axle assembly including a first axle member, a second axle member, a gear set, and a housing, said gear set transmitting rotational energy to said first and second axle members, said housing encasing a lubrication fluid and at least one of said first axle member, said second axle member, and said gear set;
a temperature-control apparatus selectively passing a fluid through an inner volume of at least one of said first axle member, said second axle member, and said housing in a heating mode to heat said lubrication fluid;
a sensor measuring a parameter indicative of an operating condition of the vehicle and generating a signal indicative of said operating condition; and
a control module in communication with said temperature-control apparatus and said sensor, said control module receiving said signal from said sensor and causing said temperature-control apparatus to operate in said heating mode based on data received from said sensor.

11. The axle system of claim 10, wherein said axle assembly is a rear-wheel-drive axle assembly.

12. The axle system of claim 10, wherein said temperature-control apparatus includes a conduit extending into said housing, said conduit being fluidly isolated from said lubrication fluid.

13. The axle system of claim 10, wherein said temperature-control apparatus selectively supplies heat from a vehicle-exhaust system of the vehicle to said axle assembly.

14. The axle system of claim 10, wherein said control module is in communication with a valve and controls said valve based on said information received from said sensor.

15. The axle system of claim 10, wherein said temperature-control apparatus is selectively operable in a cooling mode.

16. The axle system of claim 10, wherein said temperature-control apparatus includes a heat exchanger and a conduit communicating a coolant between the heat exchanger and said housing.

17. The axle system of claim 16, wherein said heat exchanger is an engine-coolant radiator.

18. The axle system of claim 10, wherein said at least one fluid property includes at least one of a temperature and a viscosity.

19. An axle system comprising:
an axle assembly including an axle member, a gear coupled with said axle member, and a housing encasing a lubrication fluid and at least a portion of said axle member and said gear therein; and
a device selectively transferring heat from an exhaust system to said lubrication fluid in a heating mode by passing a fluid through said housing.

* * * * *